United States Patent [19]

Hanawa et al.

[11] Patent Number: 5,938,798
[45] Date of Patent: *Aug. 17, 1999

[54] CATHODIC ACTIVE MATERIAL COMPOSITION FOR DRY CELLS, METHOD FOR PREPARING THE SAME, AND ALKALINE BATTERY

[75] Inventors: Kenzo Hanawa; Sakiko Taenaka; Noriko Hanzawa, all of Saitama, Japan

[73] Assignee: Mitsui Mining & Smelting Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/770,688

[22] Filed: Dec. 17, 1996

Related U.S. Application Data

[63] Continuation of application No. 08/506,136, Jul. 24, 1995, which is a continuation of application No. 08/220,903, Mar. 31, 1994.

[30] Foreign Application Priority Data

Sep. 30, 1993 [JP] Japan ................................. 5-265448
Nov. 19, 1993 [JP] Japan ................................. 5-290340

[51] Int. Cl.$^6$ ........................................... H01M 4/26
[52] U.S. Cl. ..................... 29/623.1; 429/224; 429/232
[58] Field of Search .................................. 429/224, 218, 429/232; 423/266, 274, 275; 29/623.1, 623.5

[56] References Cited

U.S. PATENT DOCUMENTS

| | | | |
|---|---|---|---|
| 1,296,700 | 3/1919 | Ruhoff | 429/232 |
| 3,414,440 | 12/1968 | Moore | 429/224 |
| 3,856,576 | 12/1974 | Prieto | 429/224 |
| 3,945,847 | 3/1976 | Kordesch et al. | 136/100 R |
| 3,951,765 | 4/1976 | Everett | 204/96 |
| 4,324,828 | 4/1982 | Ebato et al. | 429/209 |

(List continued on next page.)

FOREIGN PATENT DOCUMENTS

| | | | |
|---|---|---|---|
| 48-010964 | of 1973 | Japan | H01M 15/06 |
| 51-21125 | of 1976 | Japan . | |
| 51-21129 | of 1976 | Japan . | |
| 57-27929 | of 1982 | Japan . | |
| 58-14470 | of 1983 | Japan . | |
| 59-014265 | 1/1984 | Japan | H01M 5/08 |
| 60-138085 | of 1985 | Japan . | |
| 61-208752 | 9/1986 | Japan | H01M 4/08 |
| 62-103973 | of 1987 | Japan . | |

(List continued on next page.)

OTHER PUBLICATIONS

"Webster's New Dictionary of Synonyms",published by Merrian Webster, Inc., Springfield Mass., pp. 113–114 (no month), 1984.

European Search Report; Jan. 3, 1995; Application No. 94104907.4.

Matsuki et al.; "SEM Studies of Electrolytic Manganese Dioxide"; Electrochimica Acta, vol. 29, No. 7, Jul. 1984; Oxford GB (pp. 983–993).

(List continued on next page.)

Primary Examiner—Maria Nuzzolillo
Assistant Examiner—Carol Chaney
Attorney, Agent, or Firm—Baker & Daniels

[57] ABSTRACT

A cathodic active material comprises a mixture of graphite particles and electrolytic manganese dioxide particles which are composed of needle-like crystals having an aspect ratio ranging from about 2 to about 20 and an alkaline manganese dioxide cell is provided with a cathode prepared from the cathodic active material. The cathodic active material for dry cells can be prepared by mixing, in advance, carbon powder with manganese dioxide powder in a weight ratio ranging from about 1:100 to about 15:100 and then pulverizing the resulting mixture. The novel cathodic active material for dry cells permits substantial improvement of the resulting dry cell in the high load-discharge quality.

3 Claims, 2 Drawing Sheets

U.S. PATENT DOCUMENTS

| | | | |
|---|---|---|---|
| 4,555,457 | 11/1985 | Dhanji | 429/232 |
| 4,948,484 | 8/1990 | Andersen | 429/224 |
| 5,204,195 | 4/1993 | Tomantschger et al. | 429/59 |
| 5,277,890 | 1/1994 | Wang et al. | 429/224 |
| 5,482,798 | 1/1996 | Mototani et al. | 429/224 |

FOREIGN PATENT DOCUMENTS

| | | |
|---|---|---|
| 63-121256 | of 1988 | Japan . |
| 63-187570 | of 1988 | Japan . |
| 63-21224 | of 1988 | Japan . |
| 63-21225 | of 1988 | Japan . |
| 63-40727 | of 1988 | Japan . |
| 2195647 | of 1990 | Japan . |
| 2213487 | of 1990 | Japan . |
| 2226656 | of 1990 | Japan . |
| 311554 | of 1991 | Japan . |
| 31444 | of 1991 | Japan . |
| 3252055 | of 1991 | Japan . |
| 59773 | of 1993 | Japan . |

OTHER PUBLICATIONS

Tung, editior "Japanese/English English/Japanese Glossary of Scientific and Technical Terms" John–Wiley and Sons, publishers, p. 548. (No month available), 1993.

Sax et al., eds. "Hawley's Condensed Chemical Dictionary", Van Nostrand Reinhold, p. 875. (No Month Available), 1987.

Sands, "Introduction to Crystallography", W.A. Benjamin, Inc. pp. 1–2, May 1969.

Van Vlack, "Materials Science for Engineers", Addison Wesley, pp. 112–113. (No Month Available), 1970.

Accession Number: 73–26888U WPIDS Ray–O–Vac Co (Japan) Cathode Mixture mfr—for alkaline primary cells, May 1973.

CATHODIC ACTIVE MATERIAL COMPOSITION FOR DRY CELLS, METHOD FOR PREPARING THE SAME, AND ALKALINE BATTERY

This is a continuation of application Ser. No. 08/506,136, filed Jul. 24, 1995, which was a continuation of application Ser. No. 08/220,903, filed Mar. 31, 1994.

BACKGROUND OF THE INVENTION

1. Field of the Invention

The present invention relates to a composition of electrolytic manganese dioxide-containing cathodic active material used as a cathodic active material for dry cells, in particular, alkaline manganese dioxide cells as well as a method for the preparation thereof. The present invention also relates to a dry cell which makes use of the foregoing composition.

2. Prior Art

Manganese dioxide has long been used, as a cathodic active material for dry cells. Manganese dioxide products used for this purpose can roughly be classified into three groups, i.e., natural manganese dioxide, chemically synthesized manganese dioxide and electrolytic manganese dioxide and are properly used depending on purposes.

Among these manganese dioxide products, electrolytic manganese dioxide provides a dry cell which has an excellent discharge quality at a high load. In addition, the ratio of dry cells using electrolytic manganese dioxide has gradually been increased since small dry cells having high capacities have recently been desired along with the miniaturization of electronic machinery and tools.

There has been increased applications of a small-sized dry cell such as the LR-6 type which can be discharged at an extremely high load such as discharge at a load of 1Ω.

The electromotive force of the dry cell composed of electrolytic manganese dioxide presently used reveal a substantial drop when the cell is discharged at a load of 1Ω, which results in a reduction of the capacity of one third the theoretical level.

Many attempts have already been made to improve the discharge quality of dry cells at a high load. For instance, Japanese Unexamined Patent Publication (hereunder referred to as "J. P. KOKAI") No. Hei 02-213487 and J. P. KOKAI No. Sho 60-138085 proposes that electrolytic manganese dioxide showing excellent properties in high load-discharge can be produced by carrying out the electrolysis in an electrolyte in which carbon fibers or carbon particles are suspended. In addition, J. P. KOKAI No. Hei 05-9773 proposes that a high quality electrolytic manganese dioxide product can be obtained by dispersing, in a manganese electrolyte, carbon fibers, and/or graphite fibers whose surface is covered with a film of a manganese oxide and by co-precipitating the fibers and manganese dioxide through electrolysis to thus obtain precipitates having a manganese dioxide content of not less than 90% by weight. Moreover, J. P. KOKAI No. Sho 63-21224 discloses a method for preparing high quality electrolytic manganese dioxide in which the electrolysis is carried out in an electrolyte suspending fine particles of manganese oxide.

The aforementioned conventional techniques direct improvement in characteristic properties of electrolytic manganese dioxide per se through appropriate adjustment of conditions for the electrolysis. Alternatively, other attempts have also been done, in which the processes for preparing a cathodic composite material subsequent to the electrolysis are improved. For instance, J. P. KOKAI Nos. Hei 03-1444, Hei 03-11554 and Hei 03-47196 disclose that the high load-discharge quality of manganese dioxide cells whose cathodic active material comprises a mixture of chemically synthesized manganese dioxide and electrolytic manganese dioxide can be highly improved as compared with the cells whose cathodic active material comprises only electrolytic manganese dioxide. In addition, J. P. KOKAI No. Sho 62-103973 discloses that high load-discharge quality of a manganese dioxide cell can be improved through the use of a electrolytic manganese dioxide which is pulverized twice, first with the usual pulverization and then again after compression. Furthermore, J. P. KOKAI No. Sho 57-27929 discloses that characteristic properties of dry cells can be improved if precipitated manganese dioxide particles are immersed in a diluted sulfuric acid solution, then neutralized and used as the cathodic active material of the cells. J. P. KOKAI No. Sho 63-21225 sets forth that characteristic properties of dry cells can be improved through the use of manganese dioxide obtained by the next process, electrolysis, rough and fine pulverization, neutralization, and adding an oxidizing agent thereto. J. P. KOKAI No. Sho 63-40727 teaches that fine particles having a size of not more than 2 $\mu$m and coarse particles having a size of not less than 92 $\mu$m are inferior in quality and that accordingly, quality of dry cells can be improved through the use of electrolytic manganese dioxide from which these fine and coarse particles are removed in advance.

On the contrary, J. P. KOKAI No. Sho 51-21125 discloses that discharge quality of dry cells can be improved by controlling the average particle size of electrolytic manganese dioxide used to not more than 5 $\mu$m. Moreover, J. P. KOKAI No. Sho 51-21129 discloses that discharge quality can be improved through the combination of improvement in the electrolyte used and the use of electrolytic manganese dioxide having an average particle size of not more than 5 $\mu$m. Further, J. P. KOKAI No. Sho 58-14470 discloses that high load-discharge quality of dry cells can be improved through the use of electrolytic manganese dioxide having an average particle size of not more than 10 $\mu$m in an electrolyte containing sodium perchlorate.

Moreover, J. P. KOKAI Nos. Hei 02-195647 and Hei 02-226656 set forth that the use of carbon black obtained by the furnace process as a conductive material permits improvement of dry cells in their high load-discharge quality. On the other hand, J. P. KOKAI No. Sho 63-121256 discloses that conductive properties of a cathodic material is improved by forming a thin film of a carbonaceous material on the surface of manganese dioxide particles and that a manganese dioxide cell having high load-discharge quality can thus be produced. J. P. KOKAI No. Sho 63-187570 teaches that the high load-discharge quality of a dry cell can be improved through the use of electrolytic manganese dioxide particles which are covered with fine particles of a carbonaceous material having an averaged particle size ratio, with respect to the manganese dioxide particles, ranging from $10^{-1}$ to $10^{-3}$ at a covering rate ranging from 0.5 to 15%. However, this invention mainly aims at the improvement of conductivity and, therefore, the particle size of the carbonaceous material should be smaller than that of manganese dioxide.

Various attempts have been proposed as has been discussed above, but all of them are still insufficient since they suffer from various problems in, for instance, that the effect attained is insufficient, that the practical production of the product proposed therein is very difficult and that mass-production of such products is impossible. Thus, there is much room for further improvement.

More specifically, electrolytic manganese dioxide should receive electrons for inducing cell discharge. This, in turn, requires migration of protons or electrons through the electrolytic manganese dioxide. However, the manganese dioxide serving as the path for electron or proton-migration is deteriorated since the rate of migrating protons or electrons per unit time is substantially increased during the high load-discharge. This leads to inhibition of proton or electron-migration and hence a reduction of electromotive force of the dry cell. Accordingly, it is believed that the particle size of electrolytic manganese dioxide particles is favorably as low as possible for the discharge at a high load.

In the conventional methods, however, if electrolytic manganese dioxide is strongly pulverized to reduce the particle size thereof, electrolytic manganese dioxide is deteriorated and accordingly, quality thereof is rather impaired, while if the particle size of the manganese dioxide particles is reduced, but aggregates thereof still remain, particles of a conductive material such as graphite are not sufficiently brought into close contact with each other and accordingly, any effect of the particle size reduction cannot be anticipated. In addition, if fine particles are used, any increase in density is not ensured when the fine particles are subjected to compression powder molding and this accordingly results in the reduction in the amount of the particles capable of being packed in a predetermined volume in a dry cell.

SUMMARY OF THE INVENTION

Accordingly, it is an object of the present invention to provide a cathodic active material for dry cells which allows the elimination of the foregoing drawbacks associated with the conventional cathodic active materials for dry cells mainly comprising electrolytic manganese dioxide, which exhibits very excellent high load-discharge quality and which may fit the mass production and to provide an alkaline manganese dioxide cell produced using the cathodic active material.

Another object of the present invention is to provide a method for preparing the foregoing cathodic active material for dry cells in high efficiency.

According to an aspect of the present invention, there is provided a cathodic active material for dry cells which comprises a mixture of graphite and electrolytic manganese dioxide in the form of needle crystals having an aspect ratio ranging from about 2 to about 20.

Electrolytic manganese dioxide should receive electrons for inducing cell discharge. This, in turn, requires migration of protons or electrons through electrolytic manganese dioxide. For this reason, the manganese dioxide serving as the path for electron or proton-migration is deteriorated since the number of migrating protons or electrons per unit time is markedly increased during the discharge at a high load. This leads to inhibition of proton or electron-migration. This is considered to be a cause of a decrease in the electromotive force of the dry cell during the discharge at a high load. Therefore, it is believed that the particle size of electrolytic manganese dioxide particles is favorably as low as possible for the discharge at a high load.

In the conventional techniques, however, if electrolytic manganese dioxide is strongly pulverized to reduce the particle size thereof, electrolytic manganese dioxide is deteriorated and accordingly, quality thereof is rather impaired, while if the particle size of the manganese dioxide particles is reduced, but aggregates thereof still remain, particles of a conductive material such as graphite do not sufficiently come in contact with each other and accordingly, almost no effect of the particle size reduction can be expected. In addition, if fine particles are used, any increase in density is not ensured when the fine particles are subjected to compression powder molding and this correspondingly leads to a decrease in the amount of the particles capable of being packed in a predetermined volume in a dry cell.

The foregoing drawbacks associated with the conventional techniques can be successfully solved by the present invention. More specifically, the present invention permits uniform mixing of fine particles by sufficient admixture of graphite with electrolytic manganese dioxide and then simultaneous pulverization of the mixture and this in turn permits substantial improvement in the high load-discharge quality of the resulting dry cells.

Moreover, if assemblies of needle-shaped crystals of electrolytic manganese dioxide having an aspect ratio ranging from about 2 to about 20 are used as a cathodic active material for dry cells according to the present invention, the resulting dry cell, in particular, alkaline manganese dioxide cell exhibits substantially improved characteristic properties during the high load-discharge. This effect is conspicuous and peculiar to the foregoing specific electrolytic manganese dioxide. Moreover, the cathodic active material of the present invention can easily be prepared from electrolytic manganese dioxide particles produced under predetermined conditions by pulverizing the particles under predetermined conditions. More specifically, the cathodic active material can be mass-produced and correspondingly the use thereof permits a reduction of the production cost.

According to another aspect of the present invention, there is also provided a method for preparing a mixture of graphite powder with electrolytic manganese dioxide particles which are composed of needle-shaped crystals discussed above.

The present invention further relates to a method for preparing a manganese dioxide composition for dry cells which comprises the steps of mixing carbon powder with manganese dioxide powder in a weight ratio ranging from 1:100 to 15:100 and then pulverizing the resulting mixture.

Manganese dioxide usable in the present invention may be those prepared by the aforementioned various methods, with electrolytic manganese dioxide being most preferred. In addition, the carbon powder is preferably graphite powder.

In particular, the combination of graphite powder with electrolytic manganese dioxide particles can provide the most optimum manganese dioxide composition.

The amount of carbon powder to be used suitably ranges from 1% to 15% on the basis of the total weight of electrolytic manganese dioxide used. This is because if the amount is less than 1%, any effect of simultaneous pulverization cannot be ensured, while if it exceeds 15%, the volume fraction of carbon powder in the mixture is too high to effectively pulverize the same. The carbon powder is added to the manganese dioxide composition for imparting sufficient conductivity thereto and for holding an electrolyte in the resulting dry cell, but the carbon powder does not always have to be added in an amount required for these purposes during the foregoing simultaneous pulverization step. The intended high load-discharge quality improving effect can be ensured by, for instance, mixing 1% of carbon powder with manganese dioxide and pulverizing the carbon powder simultaneously with the manganese dioxide particles and then mixing an additional amount of carbon powder with the pulverized mixture according to the conventional method.

The carbon powder used in the invention is most preferably graphite powder as already discussed above. The optimum effect can be ensured through the use of graphite powder having good crystallinity. Carbon black can of course be used and can provide a desired effect. Among carbon black products, preferred are those having electrical conductivity as high as possible. This is because a sufficient effect can be expected through the use thereof in a small amount (or a low mixing ratio).

Among manganese dioxide products, electrolytic manganese dioxide is most effective in the invention, but both chemically synthesized and natural manganese dioxide products can be improved in the high load-discharge quality through pulverization thereof simultaneous with, for instance, graphite powder.

The simultaneous pulverization step can be performed by sufficiently mixing components required under dry conditions in, for instance, a twin-cylinder mixer, then adding water to the resulting mixture for adjusting the slurry concentration to the range of from 10 to 80% and wet-pulverizing the slurry. If the slurry concentration is less than 10%, pulverization efficiency is insufficient and the product gets greatly contaminated with impurities. On the other hand, it exceeds 80%, the viscosity of the resulting slurry is too high to perform effective pulverization. The wet-pulverization is preferably carried out in a medium type pulverizer such as ball mill or bead mill, but may be performed in an earthenware mortar type pulverizer such as a thunder mill or a stone mortar type pulverizer. The use of the manganese dioxide pulverized into particles having a particle size ranging from 0.1 to 9 $\mu$m would result in an excellent effect. If the particle size thereof is greater than 9 $\mu$m, only an insufficient effect can be attained by the simultaneous pulverization procedure. However, the mixture is extremely pulverized, the structure of manganese dioxide is broken and the properties of the resulting composition is rather reduced.

The pH of the slurry is not critical in the pulverization step. After the pulverization, an electrolyte is added to the pulverized slurry or the pulverized slurry is filtered and dried and then an electrolyte is added thereto to give a cathodic active material. Alternatively, the powdery ingredients can be mixed and pulverized in the presence of an electrolyte.

The carbon powder can serve as a lubricant during the foregoing simultaneous pulverization step and accordingly, permits the pulverization of electrolytic manganese dioxide into fine particles without causing any deterioration of properties thereof and can ensure sufficient mixing of these powdery ingredients.

BRIEF DESCRIPTION OF THE DRAWINGS

The present invention will become more apparent from the detailed explanation given below with reference to the accompanying drawings, wherein.

DETAILED DESCRIPTION OF THE INVENTION

The inventors of this invention have accumulated the results of systematic studies on the bonding, structure and physical properties of electrolytic manganese dioxide crystals, have correspondingly found out that electrolytic manganese dioxide has the highest reactivity when it has a structure as shown in the accompanying drawings and thus have completed the present invention.

Figure 1:
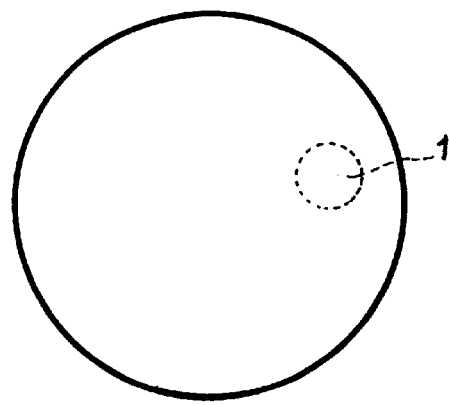
FIG. 1 is a sketch showing an image representation of a particle of an electrolytic manganese dioxide, which is drawn based on a TEM micrograph of an electrolytic manganese dioxide particle as a principal component of the cathodic active material for dry cells according to the present invention.
Figure 2:
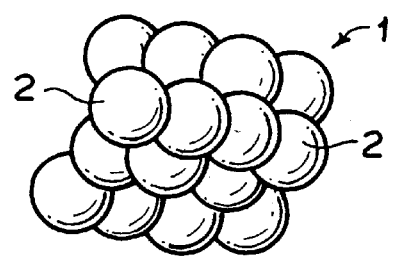
FIG. 2 is a sketch, obtained in the same way as in FIG. 1, showing a mass of crystals constituting the manganese dioxide particle shown in FIG. 1.
Figure 3:
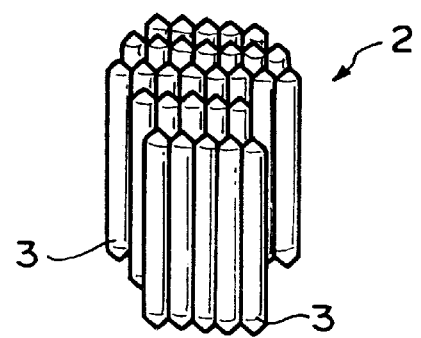
FIG. 3 is a sketch, obtained in the same way as in FIG. 1, showing a crystal grain constituting the crystalline mass shown in FIG. 2.

FIG. 1 shows a sketch diagram illustrating an electrolytic manganese dioxide particle. In this example, a particle size ranges from about 2 to about 80 $\mu$m and an average is about 30 $\mu$m. A part 1 thereof is enlarged and shown in FIG. 2. The mass of crystals shown in FIG. 2 is constituted by a plurality of crystal grains each hiving a particle size ranging from about 0.2 to about 0.6 $\mu$m. One of such crystal grains 2 is enlarged and shown in FIG. 3. A plurality of needle-like crystals 3 assemble while arranging their orientations in one direction. One of these needle-shaped crystal 3 grains is likewise enlarged and shown in FIG. 4. This is a needle-like crystal grain having an aspect ratio ranging from about 2 to about 20.

In the present invention, it is very important that the needle-shaped crystal serves as a constituent element of electrolytic manganese dioxide component and must be a long and thin grain having an aspect ratio (i.e., the ratio of the major axis to the minor axis) ranging from about 2 to about 20. If the aspect ratio is less than 2, the high load-discharge quality is never improved even when needle-shaped crystal grains are present. On the other hand, it is difficult to produce a needle-shaped crystal having an aspect ratio of higher than 20 from the technical standpoint.

There is not any limitation in the size of electrolytic manganese dioxide crystals so far as their aspect ratio falls within the range defined above, but the crystals easily produced through electrolysis have a major axis ranging from 0.05 to 0.3 $\mu$m and a minor axis ranging from 0.01 to 0.05 $\mu$m and these crystal grains can favorably used in the present invention.

The inventors of this application have further found out that properties of the cathodic active material can further be improved if electrolytic manganese dioxide crystals are adhered to the surface of scaly graphite plates. There have conventionally been known methods for enhancing the electron conductivity of the cathodic active material, for instance, a method which comprises rubbing fine particles of graphite against the surface of electrolytic manganese dioxide and a method comprising co-precipitating electrolytic manganese dioxide and carbon fibers during electrolysis in an electrolyte in which carbon fibers are suspended. However, the inventors have found out that the cathodic active material exhibits the highest activity when the graphite component used has the lowest possible thickness while holding the scaly shape thereof to optimize the electron conductivity and electrolytic manganese dioxide particles having a particle size smaller than that of the graphite are adhered to the surface of the scaly graphite particles. Therefore, the particle size of electrolytic manganese dioxide is desirably 10 μm or smaller. However, the smallest constituents of electrolytic manganese dioxide are needle-like particles and, therefore, the particle thereof cannot be miniaturized any more.

The cathodic active material of the present invention can be used in combination with the conventional electrolytic manganese dioxide for the improvement in the high load-discharge quality of the resulting dry cell. In this case, the conventional electrolytic manganese dioxide may be incorporated into the cathodic active material of the present invention after the preparation of the latter or in the course of the preparation thereof and, in any case, the same excellent effect can be ensured.

Electrolytic manganese dioxide particles having a structure as shown in FIGS. 1–4 can be prepared by a variety of methods. For instance, an acidic solution of manganese sulfate is electrolyzed at a temperature of 90° C. or higher to separate out crystals of electrolytic manganese dioxide on an anode of titanium. The resulting tile-like crystals of electrolytic manganese dioxide thus separated out are roughly pulverized, neutralized, washed with water and then dried. Thereafter, the roughly pulverized crystals are further pulverized under dry conditions into fine particles having an average particle size of about 30 μm. Alternatively, the tile-like crystals of electrolytic manganese dioxide may be pulverized, under wet conditions, into particles having an average particle size of about 30 μm followed by neutralization, water-washing and drying.

The cathodic active material for dry cells according to the present invention can be produced by uniformly mixing graphite particles with electrolytic manganese dioxide particles and then pulverizing the mixture together. The amount of graphite particles to be mixed with the electrolytic manganese dioxide particles suitably ranges from 1% to 15% on the basis of the weight of the latter. This is because if the amount of the graphite particles is less than 1%, the effect of the simultaneous pulverization of these powdery ingredients is insufficient, while if it exceeds 15%, the volume fraction of carbon powder in the mixture is too high to sufficiently pulverize the same. The carbon powder is added to the manganese dioxide composition for imparting sufficient conductivity thereto and for holding an electrolyte in the resulting dry cell, but the carbon powder has always not to be added in an amount required for these purposes during the foregoing simultaneous pulverization step. The high load-discharge quality improving effect can be ensured by, for instance, mixing 1% of graphite powder with electrolytic manganese dioxide, then simultaneously pulverizing the mixture and mixing an additional amount of carbon powder with the pulverized mixture according to the conventional method. Alternatively, the high load-discharge quality can likewise be improved by mixing 15% of graphite powder with electrolytic manganese dioxide, then simultaneously pulverizing the resulting mixture and thereafter, incorporating an additional amount of electrolytic manganese dioxide powder into the pulverized mixture through the method currently used in this art. The effect of this type becomes conspicuous, in particular, when graphite particles exhibiting good crystallinity are employed.

The pulverization of the mixture of graphite and electrolytic manganese dioxide particles can be performed by sufficiently mixing, under dry conditions, the particles in a twin-cylinder mixer or a rotary-tumbling mixer, then adding water to form a slurry and to adjust the slurry concentration to the range of from 10 to 80% and pulverizing the slurry under wet conditions. In this case, if the slurry concentration is less than 10%, the pulverization is ineffective or insufficient and the resulting product greatly gets contaminated with impurities, while if it exceeds 80%, the viscosity of the slurry sometimes becomes too high to efficiently pulverize it. The wet-pulverization is preferably carried out in a medium type pulverizer such as ball mill or bead mill, but may be performed in an earthenware mortar type pulverizer such as a thunder mill or a stone mortar type pulverizer. It is effective to sufficiently knead the slurry in a kneading machine such as a kneader prior to the wet-pulverization. In this respect, if the pulverization is carried out in the absence of graphite, the structure of electrolytic manganese dioxide would be broken and accordingly, properties thereof are rather lowered. It should be noted that even the foregoing simultaneous pulverization step sometimes leads to breakage of the structure of electrolytic manganese dioxide and properties thereof is rather lowered if the particles are excessively pulverized. When a shear stress for pulverization is applied to a mixture of electrolytic manganese dioxide and graphite particles uniformly admixed, the graphite particles are cleaved into scaly shapes to thus give scaly thin plates.

If the pulverization proceeds while electrolytic manganese dioxide particles are sandwiched between thin plates of graphite, assemblies of particles are formed, wherein each assembly comprises scaly graphite plates and electrolytic manganese dioxide crystals whose structure is not broken, which hold their activity and which are adhered to the scaly plates. This is because the graphite particles serve as a lubricant.

The graphite usable in the invention can be those capable of being easily cleaved into scaly particles and having good crystallinity, but may be any graphite having good cleavability. The particle size thereof is preferably greater than that of the electrolytic manganese dioxide particle. For instance, when the mixing and simultaneous pulverization is performed using electrolytic manganese dioxide having an average particle size of 30 μm, it is effective to use graphite particles having an average particle size of greater than 30 μm. However, sufficient pre-kneading permits the use of graphite particles having any size even if they have a large difference in particle size.

The smaller the particle size of electrolytic manganese dioxide particle, the higher the efficiency of the simultaneous pulverization of the powdery ingredients. However, the pulverization into fine particles sometimes results in breakage of the crystalline structure of manganese dioxide particles. Accordingly, the cathodic active material having the above discussed structure can easily be obtained by adding graphite to electrolytic manganese dioxide pulverized to an average particle size on the order of about 30 μm, then mixing and simultaneously pulverizing the resulting mixture. The cathodic active material may be produced by adding an electrolyte to the pulverized slurry or by filtering the slurry and then drying after pulverization and then adding an electrolyte to give an intended cathodic active material. Alternatively, the simultaneous pulverization step may likewise be carried out after the addition of an electrolyte to the powdery ingredients.

The graphite and electrolytic manganese dioxide particles used in the cathodic active material of the present invention have particle sizes finer than that of the conventionally used ones. Accordingly, the cathodic active material which is simply dried after the simultaneous pulverization step provides a molded product having a low bulk density (packing density) and thus does not permit any increase in the amount of the material which can be packed in a predetermined volume. This problem can be solved by granulating the dried powder. The granulation may be carried out simply by addition of water without using other additives such as binders since the powder is prepared through pulverization into fine particles.

Figure 5:
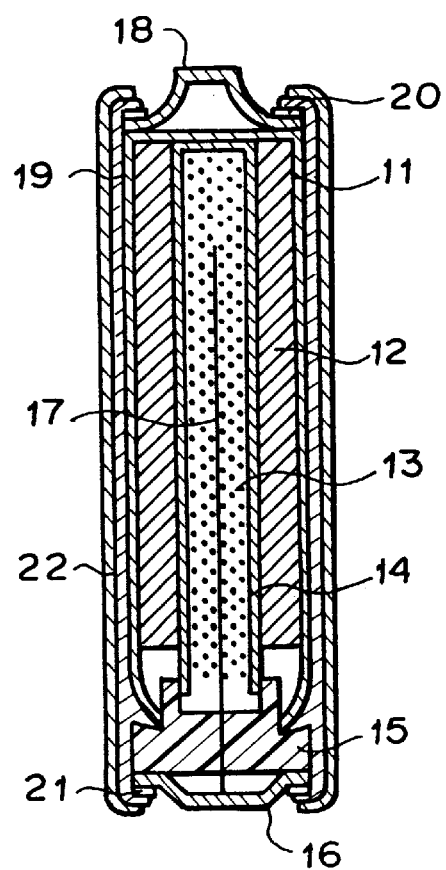
FIG. 5 is a sectional side elevation showing an embodiment of an alkaline manganese dioxide cell assembled using the cathodic active material according to the present invention.

FIG. 5 shows an embodiment of the alkaline manganese dioxide cell assembled using the cathodic active material of the present invention. In FIG. 5, the reference numeral 11 represents a cathodic can, 12 a cathode, 13 an anode (gelled zinc alloy powder), 14 a separator, 15 a sealing body, 16 an anodic bottom plate, 17 a current collector, 18 a cap, 19 a heat-shrinkable tubing, 20 and 21 each an insulating ring and 22 an outer can.

The present invention will hereunder be described in detail with reference to the following non-limitative working Examples and the effects practically achieved by the invention will also be discussed in detail in comparison with Comparative Examples.

EXAMPLE 1

A tile-like block of electrolytic manganese dioxide having a thickness of 1 cm was produced by electrolyzing an aqueous solution of manganese sulfate to thus separate out manganese dioxide on an anode of titanium. The electrolyzation was performed at an electrolyte temperature of 90° C., a manganese sulfate concentration of 20 g/l, a sulfuric acid concentration of 30 g/l and a current density of 40 A/m$^2$. A sample was cut off from the block and observed with a transmission electron microscope. As a result, it was confirmed that electrolytic manganese dioxide thus formed was composed of needle-shaped particles each having an aspect ratio ranging from about 2 to about 20 and had a structure as shown in attached FIGURES. The block was roughly pulverized, followed by neutralization, water-washing, drying and pulverization into fine particles to give electrolytic manganese dioxide particles having an average particle size of 30 μm.

After sufficiently mixing 7.2 kg of the electrolytic manganese dioxide particles having an average particle size of 30 μm with 0.8 kg of graphite powder in a twin-cylinder mixer, 6 kg of distilled water was added thereto to give a slurry and then the slurry was pulverized in a horizontal type bead mill. The slurry was sampled from the mill at residence times of 1, 2, 5, 10, 20, 30 and 180 minutes (Sample Nos. 1 to 7), each sample was filtered and dried in a dryer maintained at 60° C., followed by disintegration and impregnation with a saturated potassium hydroxide solution to thus give a cathodic active material. The cathodic active material was observed with a transmission electron microscope and the followings could be confirmed:

In Sample Nos. 1, 2, 3 and 4, electrolytic manganese dioxide crystals composed of needles having a major axis ranging from 0.5 to 0.3 μm and an aspect ratio ranging from about 2 to about 20 were adhered to the surface of scaly graphite plates. As the pulverization time increases, the particle size of the electrolytic manganese dioxide particles is reduced and there were observed the presence of many separately dispersed individual needle-shaped crystals in Sample Nos. 3 and 4. In Sample Nos. 5, 6 and 7, most of the electrolytic manganese dioxide crystals constituted by needle-shaped particles having a major axis ranging from 0.05 to 0.3 μm and an aspect ratio ranging from about 2 to about 20 were adhered to the surface of scaly graphite plates, but it was observed that many electrolytic manganese dioxide particles had rounded shapes unlike the needle-like shape observed when the particles were formed through electrolysis. The number of particles having rounded shapes increases as the pulverization time increases.

LR-6 type alkaline manganese dioxide cells were assembled using the cathodic active materials thus produced and the discharge time thereof till the electromotive force of the cells reached 0.9 V under the discharge at a load of 1Ω was determined. The results thus obtained are summarized in the following Table 1.

COMPARATIVE EXAMPLE 1

A slurry was prepared by adding 6 kg of distilled water to 7.2 kg of electrolytic manganese dioxide particles having an average particle size of 30 μm and then the slurry was pulverized in a horizontal type bead mill. After the slurry was pulverized for 3 minutes expressed in terms of the residence time in the mill, 0.8 kg of graphite was added to the slurry followed by additional mixing and pulverization over 10 minutes. The slurry was sampled from the mill (Sample No. 8), the sample was dried in a dryer maintained at 60° C., followed by disintegration and impregnation with a saturated potassium hydroxide solution to thus give a cathodic active material.

The cathodic active material was observed with a transmission electron microscope and it was confirmed that electrolytic manganese dioxide particles having a particle size ranging from 0.05 to 10 μm were adhered to the surface of scaly graphite plates, but there was not observed any needle-like particles formed during the electrolysis or particles constituted by needle-shaped crystal grains assembled while arranging their crystalline orientations in one direction.

An LR-6 type alkaline manganese dioxide cell was assembled using the cathodic active material thus produced and the discharge time thereof till the electromotive force of the cell reached 0.9 V under the discharge at a load of 1Ω was determined. The same procedures used above were repeated except for using samples (Sample Nos. 9 and 10) withdrawn from the mill at residence times of 30 minutes and 3 hours and the discharge time thereof was determined in the same manner. The results thus obtained are likewise listed in Table 1.

COMPARATIVE EXAMPLE 2

A slurry was prepared by adding 6 kg of distilled water to 7.2 kg of electrolytic manganese dioxide and pulverized in a horizontal bead mill. The slurry was sampled at residence times of 1, 2, 5, 10, 20, 30 and 180 minutes and each sample was filtered and dried in a dryer maintained at 60° C. followed by disintegration, addition of 10% graphite powder under wet conditions, mixing in a ribbon blender and drying in a dryer maintained at 60° C. (Sample Nos. 11 to 17). Each sample was impregnated with a saturated potassium hydroxide to give each corresponding comparative cathodic active material.

LR-6 type alkaline manganese dioxide cells were assembled using these comparative cathodic active materials thus produced and the discharge time thereof till the electromotive force of the cells reached 0.9 V under the discharge at a load of 1Ω was determined. The results thus obtained are likewise listed in Table 1.

COMPARATIVE EXAMPLE 3

A tile-like block of electrolytic manganese dioxide having a thickness of 1 cm was produced by electrolyzing an aqueous solution of manganese sulfate to thus separate out manganese dioxide on an anode of titanium. The electrolyzation was performed at an electrolyte temperature of 80°

C., a manganese sulfate concentration of 14 g/l, a sulfuric acid concentration of 10 g/l and a current density of 52 A/m². A sample was cut off from the block and observed with a transmission electron microscope. As a result, it was confirmed that the electrolytic manganese dioxide thus formed was in the form of approximately spherical particles having an aspect ratio of 2 or smaller. The block was roughly pulverized, followed by neutralization, washing with water, drying and pulverization into fine particles to give electrolytic manganese dioxide particles having an average particle size of 30 μm.

The same procedures used in Example 1 were repeated except that the electrolytic manganese dioxide thus prepared was used to give samples (Sample Nos. 18 to 24) of cathodic active materials.

Separately, the electrolytic manganese dioxide used in Example 1 was mixed with graphite using a ribbon blender instead of the horizontal bead mill used in Example 1, followed by the same procedures used in Example 1 to assemble LR-6 type alkaline manganese dioxide cells and the discharge time thereof cut at the electromotive force of 0.9 V under 1Ω-discharge conditions was determined. In the following Table 1, this result was used as a standard (i.e., assumed to be 100) and other results were expressed in values relative to the standard.

Incidentally, the aspect ratio of the electrolytic manganese dioxide crystals used in the foregoing test was determined according to the following method.

Figure 4:
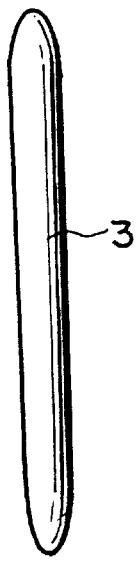
FIG. 4 is a sketch, obtained in the same way as in FIG. 1, showing a needle-shaped crystal constituting the crystal grain shown in FIG. 3.

The major axis and the minor axis of an electrolytic manganese dioxide particle were determined for needles such as those depicted in FIG. 4 appearing on a micrograph taken by a transmission electron microscope (TEM) and the ratio: major axis/minor axis was defined to be the aspect ratio of the manganese dioxide particle herein used.

Images of needle-like crystals appearing on TEM micrographs are not always clear and accordingly, the longest major and minor axes were used for the determination of the aspect ratio.

TABLE 1

| Sample No. | Aspect Ratio | Discharge Time (%) |
| --- | --- | --- |
| 1 | 3–10 | 122 |
| 2 | 3–10 | 131 |
| 3 | 3–10 | 135 |
| 4 | 3–10 | 147 |
| 5 | 3–10 | 157 |
| 6 | 3–10 | 136 |
| 7 | 3–10 | 87 |
| 8 | 3–10 | 78 |
| 9 | 1–2 | 58 |
| 10 | 1–2 | 49 |
| 11 | 1–2 | 95 |
| 12 | 1–2 | 86 |
| 13 | 1–2 | 76 |
| 14 | 1–2 | 64 |
| 15 | 1–2 | 55 |
| 16 | 1–2 | 39 |
| 17 | 1–2 | 28 |
| 18 | 1–2 | 47 |
| 19 | 1–2 | 49 |
| 20 | 1–2 | 57 |
| 21 | 1–2 | 68 |
| 22 | 1–2 | 34 |
| 23 | 1–2 | 26 |
| 24 | 1–2 | 15 |

EXAMPLE 2

After sufficiently mixing 8 kg of electrolytic manganese dioxide particles with 0.6 kg of graphite powder in a twin-cylinder mixer, 9 kg of distilled water was added thereto to give a slurry and then the slurry was pulverized in a horizontal type bead mill. The slurry was sampled from the mill at residence times of 2, 5, 10, 20 and 30 and 180 minutes, each Sample was filtered and dried in a dryer maintained at 60° C., followed by disintegration and impregnation with a saturated potassium hydroxide solution to thus give a cathodic active material. LR-6 type alkaline manganese dioxide cells were prepared using the cathodic active material thus prepared.

The discharge time thereof till the electromotive force of the cells reached 0.9 volt under the discharge at a load of 1Ω was determined.

Moreover, the same procedures used above were repeated except that a ribbon blender was substituted for the horizontal bead mill used above to likewise give an LR-6 type alkaline manganese dioxide cell and then the discharge quality thereof was determined. In the following Table 2, this result was used as a standard (i.e., assumed to be 100) and other results were expressed in values relative to the standard.

COMPARATIVE EXAMPLE 4

A slurry was prepared by adding 9 kg of distilled water to 8 kg of electrolytic manganese dioxide particles and then the slurry was pulverized in a horizontal type bead mill. After the slurry was pulverized for 10 minutes expressed in terms of the residence time in the mill, 0.6 kg of graphite was added to the slurry followed by additional mixing and pulverization over 20 minutes. The slurry was filtered and dried in a dryer maintained at 60° C., then sampled from the mill, followed by disintegration and impregnation with a saturated potassium hydroxide solution to thus give a cathodic active material. An LR-6 type alkaline manganese dioxide cell was assembled using the cathodic active material thus produced and the discharge time thereof till the electromotive force of the cell reached 0.9 V under the 1Ω-discharge conditions was determined. The same procedures used above were repeated except for using samples withdrawn from the mill at residence times of 30 and 180 minutes and the discharge time thereof was determined in the same manner. The results thus obtained are listed in Table 2 given below.

COMPARATIVE EXAMPLE 5

A slurry was prepared by adding 9 kg of distilled water to 8 kg of electrolytic manganese dioxide and pulverized in a horizontal bead mill. The slurry was sampled at residence times of 2, 5, 10, 20, 30 and 180 minutes and each sample was dried in a dryer maintained at 60° C. followed by disintegration, addition of 7% graphite powder under wet conditions, mixing in a ribbon blender and drying in a dryer maintained at 60° C. Each sample was impregnated with a saturated potassium hydroxide to give each corresponding cathodic active material. LR-6 type alkaline manganese dioxide cells were assembled using these cathodic active materials thus produced and the discharge time thereof till the electromotive force of the cells reached 0.9 V under the 1Ω-discharge conditions was determined. The results thus obtained are likewise listed in the following Table 2.

TABLE 2

| Sample | Pulverization Time (min) | Discharge Time (%) |
|---|---|---|
| Example 2 | 2 | 103 |
|  | 5 | 110 |
|  | 10 | 130 |
|  | 20 | 140 |
|  | 30 | 140 |
|  | 180 | 80 |
| Comp. Exam. 4 | 10 | 90 |
|  | 30 | 80 |
|  | 180 | 80 |
| Comp. Exam. 5 | 2 | 95 |
|  | 5 | 90 |
|  | 10 | 85 |
|  | 20 | 80 |
|  | 30 | 73 |
|  | 180 | 71 |

The foregoing results listed in Table 2 clearly indicate that the cell obtained using the manganese dioxide composition prepared according to the present invention exhibits a greatly elongated discharge time till the electromotive force thereof dropped to a predetermined level as compared with those observed on the cells obtained using the manganese dioxide composition prepared by the conventional method.

What is claimed is:

1. A method of producing a cathodic active material for dry cells, said cathodic active material comprising a mixture of electrolytic manganese dioxide and graphite, the method comprising the steps of: mixing said graphite with said electrolytic manganese dioxide in a weight ratio of graphite to electrolytic manganese dioxide ranging from 1:100 to 15:100 and a necessary amount of water to form a slurry having a concentration of between 10% and 80%; and then pulverizing the resultant mixture in a medium pulverizer or an earthenware mortar pulverizer, whereby the manganese dioxide produced thereby has an aspect ratio ranging from about 2 to about 20.

2. A method of producing a cathodic active material for dry cells, said cathodic active material comprising a mixture of electrolytic manganese dioxide and graphite, the method comprising the steps of:

electrolyzing an aqueous solution of manganese sulfate to separate out a block of electrolytic manganese dioxide;

roughly pulverizing the block of electrolytic manganese dioxide to break the block into smaller particles; mixing said graphite with said smaller particles of electrolytic manganese dioxide in a weight ratio of graphite to electrolytic manganese dioxide ranging from 1:100 to 15:100 and sufficient water to form a slurry having a concentration of between 10% and 80%; and then pulverizing the resultant mixture in a medium pulverizer or an earthenware mortar pulverizer to reduce the average particle size of the electrolytic manganese dioxide to between about 0.2 and 10 $\mu$m, whereby separately dispersed individual needle-shaped crystals of manganese dioxide are present and substantially unbroken.

3. The method of claim 1, wherein said pulverizing reduces the electrolytic manganese dioxide to an average particle size ranging from about 0.2 to about 10 $\mu$m.

* * * * *